EUGENE G. SCHICK
ARTHUR R. CHURCH
INVENTORS.

BY *Lyon & Lyon*

ATTORNEYS

3,354,014
PRESSURE LAMINATING PROCESS AND APPARATUS

Eugene G. Schick, Newport Beach, and Arthur R. Church, Downey, Calif., assignors to Swedlow Incorporated, Los Angeles, Calif., a corporation of California
Filed Apr. 27, 1964, Ser. No. 362,866
8 Claims. (Cl. 156—189)

ABSTRACT OF THE DISCLOSURE

This patent describes an apparatus comprising a mandrel, a wall spaced from and surrounding the mandrel, at least one layer of wound cable surrounding the wall, connecting means attached to the wall in the mandrel to form a pressure chamber therebetween, sealing means attached to the connecting means and adapted to seal the chamber, and means for admitting a pressurized fluid into the pressure chamber. This patent also describes a pressure curing process comprising positioning a curable material on a mandrel, covering the curable material with a protective sheet, securing the edges of the sheet to the mandrel, surrounding the mandrel with a wall which is spaced from the protective sheet and adapted to cooperate with the mandrel to form a pressure chamber, providing the wall with at least one layer of wound pre-tensioned cable on its outer surface and introducing a pressurizing fluid into the space between the wall and the mandrel so that pressure is exerted on the curable material through the protective sheet.

---

The present invention relates to a process and apparatus for pressure laminating or molding. More particularly, the present invention relates to a process and apparatus for pressure laminating or molding which are suitable for the production of massive articles.

The conventional method which has been employed for the production of articles of moderate size having cylindrical or conical cross-sections, such as missile nozzle sections, comprises winding a tape onto a mandrel having the desired configuration, pressure curing the tape, and machining. The tapes used in this conventional process generally comprise a substrate such as a silica fabric or glass fiber which substrate has been impregnated with a phenolic resin such as a phenol-formaldehyde or a phenol-formaldehyde-silane reaction product. The pressure curing of the wound tape generally requires pressures ranging from about 500 p.s.i. to about 15,000 p.s.i. and heat in excess of 320° F. The pressure curing step is ordinarily performed in a hydroclave, i.e., a vessel filled with a liquid which is subjected to heat and pressure. While this process has been found satisfactory for articles of moderate size, the new "generation" of missiles and rockets which are presently being developed requires nozzles which are of greatly increased sizes, e.g., on the order of 400 inches in diameter or more.

Although it is undoubtedly possible that a hydroclave having an inside diameter of more than 400 inches and capable of withstanding more than 1000 p.s.i. could be designed and produced, it is believed that no such hydroclave has yet been produced. The problems involved in the production and use of such a hydroclave would, of course, be many. First, a steel or other metal shell having the required pressure resistance, including a safety factor which ordinarily has a value of about 4 to 1, would have to be devised. Second, a sealing device which would withstand the tremendous internal pressures in the vessel would have to be devised. Third, the consequences of a structural failure in such a vessel would be so severe that great skill, time and expense would have to be devoted to the operation and maintenance thereof.

Many of the problems presented by hydroclaves have been overcome by an apparatus which has come to be known as a "cable-clave" which comprises an inner mandrel upon which the material to be cured is positioned and a series of caul plates which are positioned around the outer surface of the material to be cured. The caul plates are so arranged that they are capable of sliding motion with relation to each other such that the effective inner diameter of the group of caul plates may be decreased by applying tension to the outer surface of the caul plates by means of a cable which is spirally wound around the caul plates. This apparatus is extremely efficient in developing high pressures in a simple and effective manner. However, the cable-claves known to the prior art have been substantially limited with regard to the shape of the section which is to be cured. Thus, while cylindrical and conical sections may be cured efficiently in existing cable-claves, a great deal of difficulty has been encountered in attempts to cure irregularly shaped sections.

The present invention obviates all of these difficulties and permits the fabrication of massive and irregular sections and laminates in an easy, simple and inexpensive manner.

It is a principal object of the present invention to provide a process and apparatus for pressure laminating or molding wherein massive and irregular shapes may be easily and efficiently formed and cured.

It is another object of the present invention to provide a process and apparatus for pressure laminating wherein the tape winding, pressure curing and, if any, subsequent machining may be performed without moving the mandrel or uncured laminate.

It is a further object of the present invention to provide a process and apparatus for pressure laminating or molding wherein pressure is exerted by the force of a wound, pre-stressed cable or the like.

It is still a further object of the present invention to provide a process and apparatus for pressure laminating or molding wherein pressure is exerted by a wound, pre-stressed cable or the like acting in conjunction with a thin metal shell.

It is still another object of the present invention to provide a process and apparatus for pressure laminating or molding wherein pressure is exerted by wound, pre-stressed cables acting in conjunction with a thin metal shell and wherein a heating medium is passed through the center of a mandrel.

Other objects and advantages of the present invention will be readily apparent, it is believed, from the following detailed description of preferred embodiments thereof when read in connection with the accompanying drawings.

Briefly, the present invention comprises a process and apparatus for pressure laminating or molding wherein the material to be cured is positioned around a mandrel, e.g., by winding a tape composed of a material which may be pressure cured around the mandrel. The tape is then covered with a protective sheet fabricated from rubber or a similar material with the edges of the protective sheet being bonded to the mandrel. An outer wall comprising a thin metal shell upon which a series of cables have been circumferentially wound and pre-tensioned is then positioned around the mandrel and protective sheet such that a space remains between the inner surface of the wall and the protective sheet. The outer wall and mandrel are then secured such that the space therebetween is effectively sealed. Pressurizing fluid, e.g., water, is then admitted into the space between the outer wall and the mandrel such that pressure is applied to the protective sheet and the material beneath the sheet. This pressurizing fluid may be heated so as to supply both the heat and pressure for curing, but is is preferred to pass a heating medium such as hot gas through the center of the mandrel such that the material to be cured is cured outwardly from the mandrel, thereby reducing the possibility of volatile entrapment. It is also preferred to conduct the hot gas around the outer surface of the outer wall to maintain the pressurizing fluid at the desired temperature.

Figure 1:
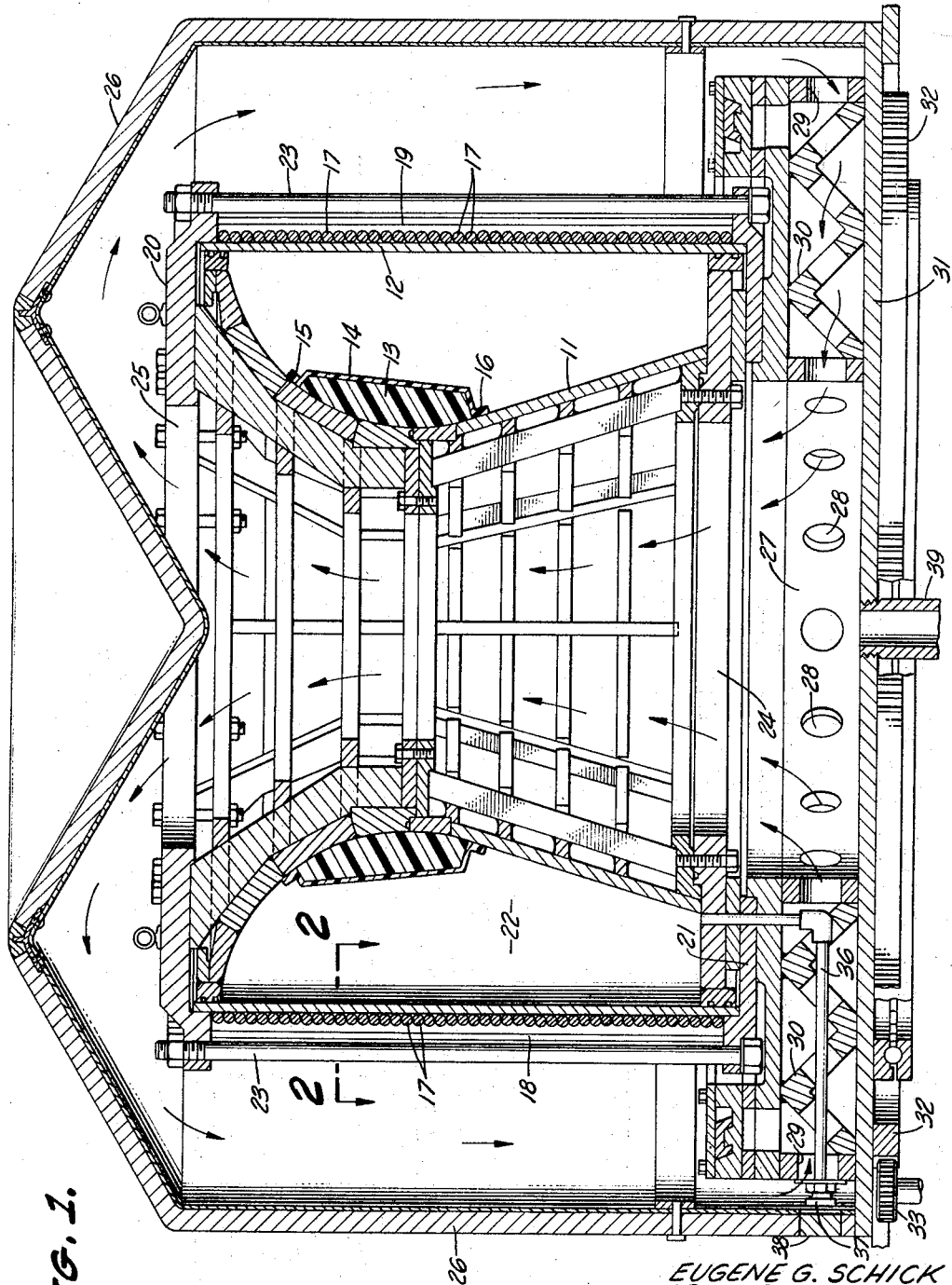
FIGURE 1 is a cross sectional illustration of one embodiment of the present invention.

Referring now to FIGURE 1, mandrel 11 is shown surrounded by thin metal shell 12. Wound tape 13 is supported on mandrel 18 and is surrounded by protective rubber sheet 14. The edges 15 and 16 of rubber sheet 14 are bonded to mandrel 11. A bleeder cloth (not shown) may be positioned between tape 13 and sheet 14 to absorb the volatile products resulting from resin polymerization and diluents.

Wall 12 is surrounded by a plurality of circumferentially wound pre-stressed cables. Preferably, each cable is wound 1.5 times around the shell 12 (540°) and terminates in termination stave 18 or termination stave 19. By means of bolt tension, the cables are pre-loaded and become the restraining members when the unit is pressurized. Sealing rings 20 and 21 are adapted to seal space 22 between mandrel 11 and shell 12. The sealing pressure is provided by a series of bolts 23. A suitable means 36 is provided for admitting pressurized fluid into space 22. This means may also be used to drain fluid from space 22. Means 36 is provided with closure means 37 which functions to maintain the desired pressure. Access to closure means 37 may be had by removing cap 38 from the adjacent portion of enclosure 26. Hot gas inlet means 39 is provided in base 31 and functions to admit the hot gas which is circulated in enclosure 26.

Mandrel 11 is hollow and is provided with a lower opening 24 and an upper opening 25 so as to permit the passage of gas through the center of the mandrel. An outer enclosure 26 is also provided to facilitate circulation of the gas through the center of the mandrel and around the outside of wall 12 as indicated by the arrows. Mandrel 11, sealing rings 20 and 21, shell 12 and associated members are mounted on annular base 27. The inner wall of base 27 is provided with ports 28 and the outer wall of base 27 is provided with ports 29. The space between the inner and outer walls of base 27 is provided with baffles 30. Thus, the heating medium passes through ports 29, baffles 30, ports 28, openings 24 and 25 and down around the outer surface of shell 12. A suitable heating means (not shown) may be provided for maintaining the heating medium at the desired temperature.

Enclosure 26 is mounted on base 31 which in turn is mounted on rotatable support 32. Thus, the entire assembly may be rotated by drive means 33 to facilitate tape winding, machining or other operations.

Figure 2:
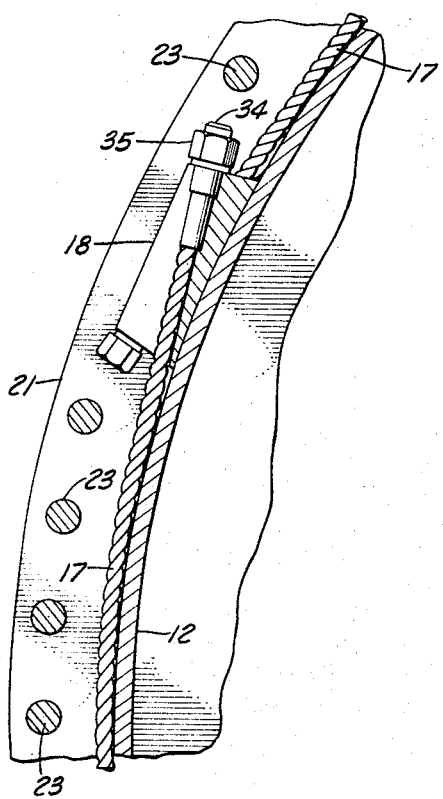
FIGURE 2 is a detailed illustration of the means employed to terminate the circumferentially wound, prestressed cables.

Cable termination stave 18 is illustrated in more detail in FIGURE 2. As shown, bolt 34 functions to secure cable 17 in stave 18. Nut 35 cooperates with bolt 34 to secure cable 17 and also serves as a means for pre-tensioning cable 17.

According to the present invention, massive and irregular laminates which may be used as rocket nozzle or nose cone sections may be formed by winding a tape around mandrel 11. These tapes may comprise a matrix of woven silica, glass fibers, asbestos, etc., impregnated with a phenolic resin such as a phenol-formaldehyde condensation product or a phenol-formaldehyde silane reaction product. However, it is to be understood that any tape capable of being pressure cured or any molding material capable of being pressure cured may be used in the practice of the present invention. A rubber or similar protective sheet 14 is provided as a cover for wound tape 13 to protect the tape 13 from the pressurizing fluid which is admitted to space 22. In accordance with good engineering practice, although not absolutely essential, a bleeder cloth may be provided between protective sheet 14 and tape 13. The bleeder cloth may be made of any coarse fabric and functions to absorb substances which may be squeezed out of the tape during compression as well as volatiles which are driven off by the heat applied during the curing step. Thin metal shell 12 which carries circumferentially wound pretensioned cables 17 is then positioned around mandrel 11 and secured to mandrel 11 by sealing rings 20 and 21. Sealing rings 20 and 21 are held in sealing relationship with shell 12 and mandrel 11 by bolts 23. Cables 17 are preferably wrapped one and one-half times (540°) around shell 12.

Wound cables 17 are capable of withstanding tremendous pressures, such as those which are necessary for pressure curing. The ultimate pressure is applied by admitting a pressurizing fluid such as water into space 22. In order to accomplish pressure curing, a heating medium such as hot air is passed through the center of mandrel 11 and around the outer surface of shell 12 while the pressure is exerted. In general, pressures of from about 250 p.s.i. to about 1500 p.s.i. and usually about 1000 p.s.i., are used. The hot air or other heating medium is usually maintained at a temperature of 450° F. and the pressurizing water in space 22 is usually maintained at a temperature of about 200° F. However, it will be readily apparent to those skilled in the art that these temperatures may be varied within wide limits depending upon the material pressure cured.

Unlike previous cable-claves, the apparatus of the present invention permits pressure curing of articles having virtually any shape since protective sheet 14 may be easily contoured to accommodate the desired shape. Thus, the present invention not only permits the fabrication of massive laminates which must be subjected to high pressure and heat in an unexpectedly simple and economical manner, but it also permits the fabrication of highly irregular shapes. In addition, the necessity for moving the uncured laminates from the winding apparatus to the pressure curing apparatus, as must be done with conventional hydroclaves, is eliminated. However, it is also to be understood that in the present invention it may be used for the fabrication of articles which are not of massive size. There is neither an upper nor a lower limit on the sizes of the articles which may be produced according to the present invention.

The pressure cured product of the present invention may be machined and a filament wound in the conventional manner if desired. The present invention is particularly suited to the production of rocket nozzles, nose cones and similar articles. However, it is to be understood that this invention may also be used for any purpose in which it is desired to exert pressure or pressure and heat on a curable or other material.

The sealing pressure exerted by bolts 23 may also be obtained by using cables in place of these bolts. These cables may be straight or may be wrapped one or more times around cables 17 and secured at each end to sealing rings 20 and 21.

Furthermore, it should be pointed out that a wide variety of resins and molding compounds may be used in the present invention. Thus, in place of phenolics, other resins such as epoxies, novalacs and others known to those skilled in the art may be used. It will also be apprent that lay-up procedures other than tape winding may be used such as, for example, the application to the mandrel of preimpregnated fibrous reinforcing material in bulk form.

Having fully described the present invention, it is to be understood that it is not to be limited to the specific details set forth, but is of the full scope of the appended claims.

What is claimed is:
1. Apparatus comprising a mandrel, a wall spaced from and surrounding said mandrel, at least one layer of wound cable surrounding said wall, connecting means attached to said wall and said mandrel so as to form a pressure chamber therebetween, sealing means attached to said connecting means and adapted to seal said chamber, and means for admitting a pressurizing fluid into said pressure chamber.

2. Apparatus comprising a mandrel, a wall spaced from and surrounding said mandrel, means for effecting a seal between said wall and said mandrel so as to form a pressure chamber therebetween, a plurality of staves extending along the length of said wall, and a plurality of wound cables surrounding said wall, said cables being connected to said staves.

3. The apparatus of claim 2 wherein said cables are pre-tensioned.

4. The apparatus of claim 3 wherein said mandrel is hollow whereby a heating medium may be passed therethrough.

5. Apparatus comprising a mandrel, a wall spaced from and surrounding said mandrel, means for effecting a seal between said wall and said mandrel so as to form a pressure chamber therebetween, at least one layer of wound cable surrounding said wall, a hood spaced from and surrounding said mandrel, wall and cable, and means for admitting pressurizing fluid into the space defined by said wall and said mandrel.

6. The apparatus of claim 5 wherein said mandrel is hollow, the inner walls of said mandrel and the inner walls of said hood cooperating to define a passage for the flow of a heating medium through said mandrel and around the outer surface of said wall and said cable.

7. The apparatus of claim 5 wherein said cable is pre-tensioned.

8. A pressure curing process comprising positioning a curable material on a mandrel, covering said curable material with a protective sheet, securing the edges of said sheet to said mandrel, surrounding said mandrel with a wall, said wall being spaced from said protective sheet and being adapted to cooperate with said mandrel to form a pressure chamber, providing said wall with at least one layer of wound pre-tensioned cable on the outer surface thereof, and introducing a pressurizing fluid into the space between said wall and said mandrel whereby pressure is exerted on said material through said protective sheet.

References Cited

UNITED STATES PATENTS 3,272,672    9/1966    Lampman et al. _____ 156—189

EARL M. BERGERT, *Primary Examiner.*

M. L. KATZ, *Assistant Examiner.*